May 30, 1950 W. G. HUTTINGER 2,509,435
COMBINED GENERAL DUTY AND WRECKER TRUCK
Filed Feb. 28, 1947 2 Sheets-Sheet 1
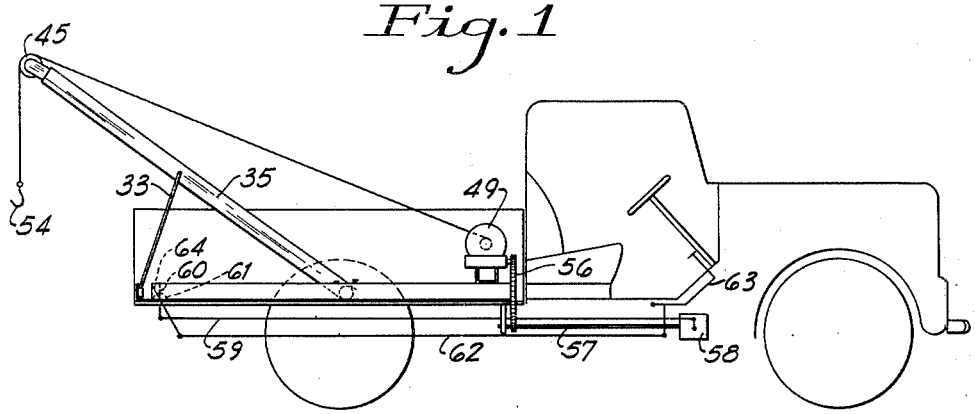
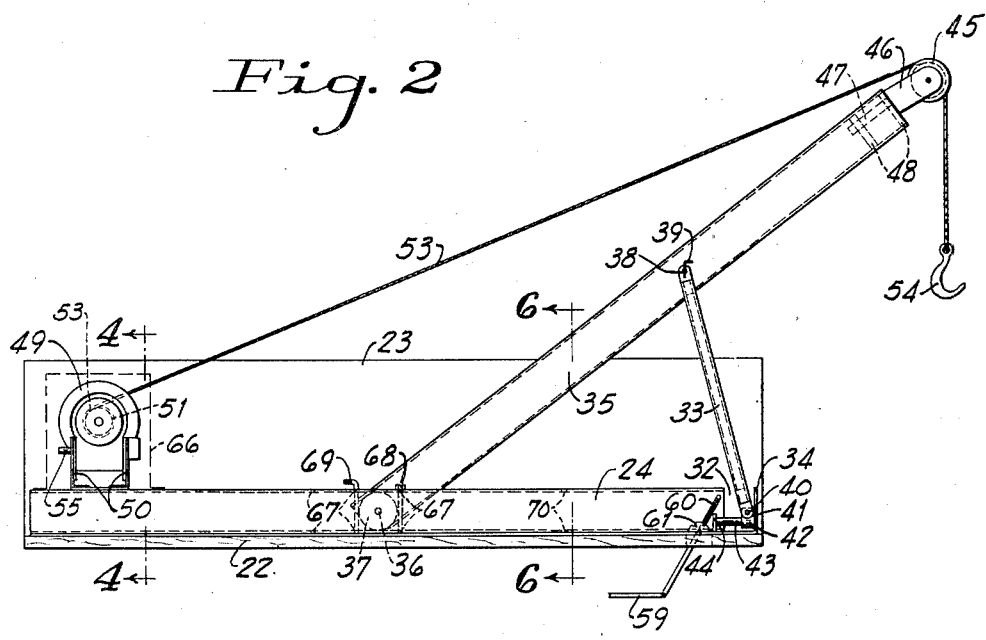
INVENTOR.
Walter G. Huttinger
BY Edward A. Lawrence
his attorney May 30, 1950 W. G. HUTTINGER 2,509,435
COMBINED GENERAL DUTY AND WRECKER TRUCK
Filed Feb. 28, 1947 2 Sheets-Sheet 2
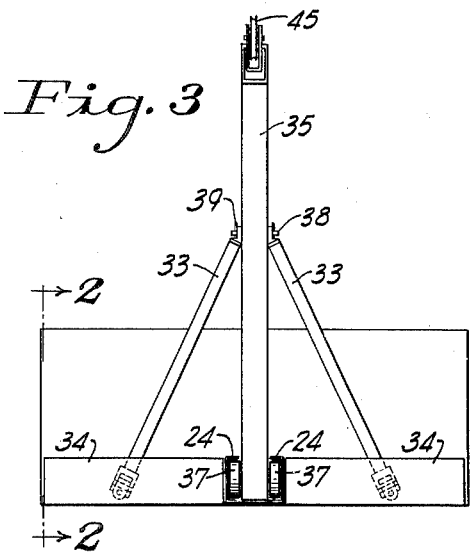
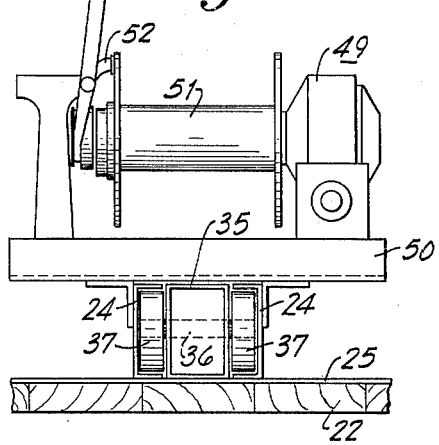
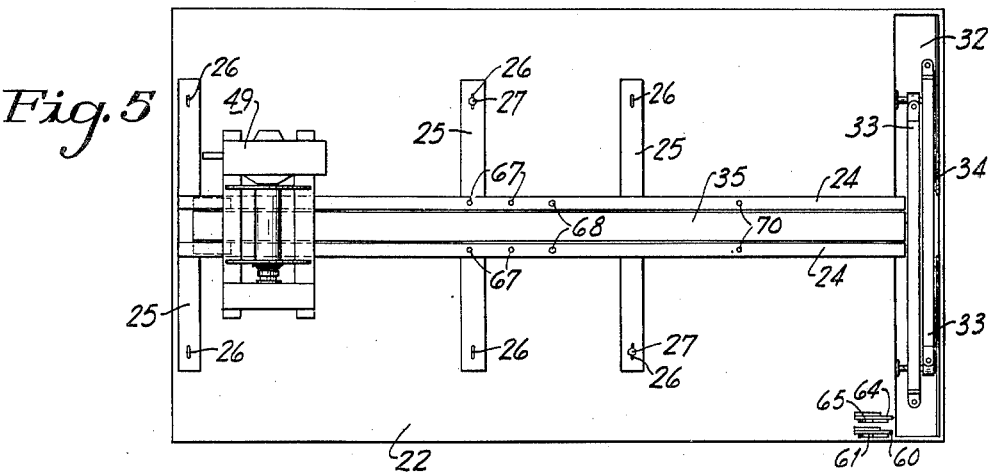
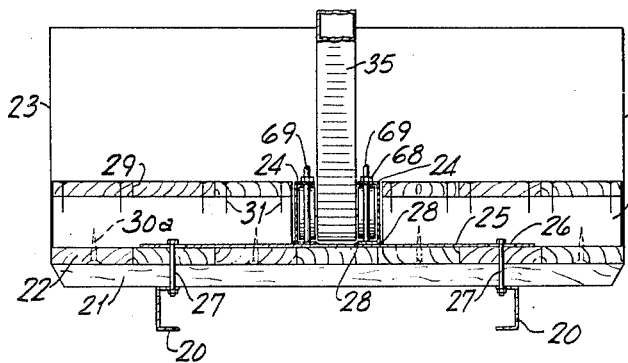
INVENTOR.
Walter G. Huttinger
BY
Edward A. Lawrence
his attorney.

Patented May 30, 1950

2,509,435

UNITED STATES PATENT OFFICE 2,509,435

COMBINED GENERAL DUTY AND WRECKER TRUCK

Walter G. Huttinger, Pittsburgh, Pa., assignor to Guibert Steel Company, Pittsburgh, Pa., a corporation of Pennsylvania Application February 28, 1947, Serial No. 731,542

6 Claims. (Cl. 254—139.1)

My invention consists in a new and improved combined general duty and wrecker truck.

The principal object of my invention is the provision of means for adding to a general purpose truck an improved boom and winch assembly which will adapt the vehicle for use for wrecking purposes without impairing its availability for general hauling purposes, and which will enable the truck to be shifted from one purpose to the other quickly and conveniently without requiring substitution of parts.

For this purpose I have invented a new and improved winch and boom structure arranged to be mounted on the floor of the truck bed, and the boom of which when in use to be advanced and raised into operative position and lowered and retracted to the level of a supplemental or upper floor when not in use, to provide a continuous load supporting surface suitable for general hauling purposes.

Novel features of construction and of arrangement of parts will appear from the following description.

In the accompanying drawings, wherein are illustrated the principles of my invention, Fig. 1 is a side elevation of the wrecker truck showing the derrick boom extended into its operative position for wrecking purposes and also showing the power take off from the truck motor to the winch and the clutch control, both operated from the rear of the wrecker truck.

Fig. 2 is a longitudinal section of the body of the wrecker truck on enlarged scale taken along the dotted line 2—2 in Fig. 3, the boom being shown in its operative position, with the sheave mounted on the free end of the boom and the cable extended and running over the sheave;

Fig. 3 is a rear end elevation looking from the right in Fig. 2;

Fig. 4 is a transverse section taken along the dotted line 4—4 in Fig. 2;

Fig. 5 is a plan view of the permanent floor of the truck bed, the supplemental floor and the sides of the truck body being omitted, showing the mounting of the channel beams which form the track on which the boom is arranged for movement to retract or extend the boom.

Fig. 6 is a sectional view taken along the dotted line 6—6 in Fig. 2, showing the structure of the supplemental floor, the channel beams and the extended boom.

Referring in detail to the drawings, 20, Fig. 6, indicates the longitudinal beams of the truck body upon which the transversely disposed bolsters 21 are mounted. 22 indicates the permanent or original floor of the truck body, which is usually formed of planks, and 23 indicates the vertical sides of the body.

24 indicates a pair of parallel channel beams set on edge and facing toward each other, as shown in Figs. 3 and 6. The channel beams extend longitudinally of the floor 22 at either side of the longitudinal center of the latter. 25 indicates a plurality of equally spaced apart flat steel bars mounted on the floor 22 and extending transversely of the latter. These bars are provided with longitudinally slotted holes 26 to receive the through bolts 27 which extend downwardly through the floor 22 and the bolsters 21 and the top flanges of the beams 20, nuts being screwed on the lower ends of the bolts to hold the elements in fixed relation. The elongation of the bolt holes 26 in the bars 25 serves to accommodate the bars to different spacings of the beams 20 of the truck.

The channel beams 24 rest upon the bars 25 and are fixed thereto as by welding, indicated at 28, thus forming an internal track.

29 indicates the supplemental floor sections, usually formed of planks, extending longitudinally of the truck body. 30 indicates joist extending transversely of the truck body from the sides 23 to the adjacent channel beams 24. These joist are preferably wooden and are secured to the permanent floor 22 in any convenient manner as by screws 30a extending up through the floor 22 into said joist. The false floor 29 is secured as by spikes 31 to the joist 30.

The upper surface of the supplemental floor is level with the upper surface of the channel beams 24.

The supplemental floor sections and the channel beams stop short of the rear end of the truck floor 22 as shown in Fig. 2, to provide a compartment 32 into which the braces 33 for the boom are nested when the boom is retracted.

At either side of the channel bars 24, the transversely disposed steel plates 34 extending from each side of the truck body to the adjacent channel beam serve to form rear walls for the compartment 32. The space between the inner ends of the aligned plates 34 provides clearance for the rearward movement of the boom 35.

The boom, which as shown in Fig. 6 is preferably formed of two opposing channel shapes with abutting flanges welded together, is rectangular in cross-section and of sufficient width to slide between the inturned flanges of the channel beams 24, and of sufficient depth so that its top surface, when it is retracted between the channel bars, is level with the top surfaces of said bars to complete with the said bars and the supplemental sections the floor 29 a continuous burden-carrying surface.

At one end, the front end when it is retracted and its lower end when it is extended and raised, the boom is provided with a transverse axle 36, Fig. 4, journaled in the side walls of the boom and having mounted on its ends the steel rollers 37 which run in the channel beams 24 between the upper and lower flanges of the beams. Thus the channel beams serve as a track for the rollers to permit the boom to be moved longitudinally of the truck body, while the axle 36 serves as the pivot upon which the beam may be swung in a vertical plane to permit its free end to be elevated or depressed.

Intermediate of its length the boom is provided with a transversely disposed pin 38 fixed in holes in the side walls of the boom and protruding therefrom at each side a short distance insufficient to engage the vertical walls of the channel beam when the boom is retracted between the channel beams.

The free ends of the braces 33 are flattened and provided with holes with which to engage the ends of the pin 38, when the boom is elevated, and they are retained on the pin 38 by latch pins 39 inserted through holes in the pin 38.

The other ends of the braces, the lower ends in Figs. 2 and 3, are secured by universal joints in the compartment 32 at the opposite sides of the rear of the truck floor 22. Thus the ends of the braces are flattened and are pivotally secured as by a pivot bolt 40 and a nut to the flanges 41 of the collars 42, which collars in turn are mounted on the fixed shafts 43, the rear ends of which are secured in holes in the plates 34, while the front ends of the shafts are fixed in holes in the vertical brackets 44 fixed on the truck floor 22. The collars 42 are rotatable on and slidable longitudinally of the shafts 43.

Thus the braces are permanently connected to the floor by means of universal joint devices and may be swung in a plane transverse to the truck body and also in a plane longitudinal of said body.

Again by sliding one of the collars 42 on its shaft toward the plate 34, and the other collar 42 on its shaft toward the bracket 44, the braces when disengaged from the boom may be folded down side-by-side in the compartment 32 as shown in Fig. 5.

45 indicates a sheave journaled in a bifurcated bracket 46, the bridge portion of which is provided with a rearwardly extending pivot pin 47 which, when the bridge portion of the bracket is placed against the squared end of the boom, is inserted through and journaled in registering holes in a pair of spaced apart transverse walls 48 in the interior of the boom and adjacent its outer extremity. Thus the sheave may be removably mounted on the rear end of the boom when the latter is in use but may be readily removed from the boom when the latter is to be lowered and retracted. It will be noted that the sheave may pivot relative to the boom, thus turning the sheave into proper position for connecting the cable to a load not directly in the rear of the boom.

49 indicates a winch which is mounted by means of its base on a pair of transversely disposed angle beams 50 which in turn rest upon and are secured to the channel beams 24 adjacent the front ends of the latter. 51 is the winch drum provided with the usual brake 52. 53 is a cable or wire rope partially wound on the drum and which when the boom is in its extended and elevated position, illustrated in Fig. 2, extends along the boom and over the sheave 45 and has a hook 54 attached to its free end. When the boom is lowered and retracted between the channel beams 24 the cable is fully wound up on the drum 51.

The winch is power driven by means of the usual worm shaft 55 which is connected to the power take off of the truck motor by means of a sprocket on the outer end of the worm shaft connected by a chain 56 to a sprocket on the rear end of an intermediate power shaft 57 extending forwardly of the truck to a drive gear in the transmission box indicated at 58. 59 indicates a link, connected to the transmission to shift the gear, which extends to the rear end of the truck where it is connected with the operating lever 60 provided with a spring detent to engage in one of the notches in a quadrant 61 to lock the gear in the transmission either in its engaged or disengaged position.

62 indicates a link attached at its front end to the clutch pedal lever 63 and at its rear end attached to the operating lever 64 provided with a notched quadrant 65 and a spring detent to engage the latter.

Thus the power may be connected to the winch by shifting the proper gear in the transmission and letting in the clutch, and the power may be disconnected by throwing out the clutch and shifting the gear in the transmission of the truck motor to its inoperative position.

When the cable is wound up on the winch and the boom is retracted, a box cover, indicated in dotted lines at 66, Fig. 2, may be set down over the winch to protect the same.

When the truck is used for ordinary load hauling purposes the cable is withdrawn from the sheave and wound up on the winch and the box cover set down over the latter, the sheave is dismounted from the free end of the boom, and the braces are detached from the boom and folded in the compartment. The boom is lowered and retracted between the channel beams, thus providing an unobstructed load-supporting surface.

When the truck is to be arranged as a wrecker the boom is extended and raised and the braces raised and connected at their upper ends to the boom, the sheave is mounted on the free end of the boom, the box cover is removed from the winch and the cable run out along the boom and over the sheave.

In practice it is necessary to anchor the lower end of the boom against movement relative to the channel beams 24 when the boom is in its elevated position. For that purpose I provide pairs of holes 67 in the upper and lower flanges of the channel beams 24, said pairs being aligned in groups in vertical planes transverse to the channel beams 24, and said groups being spaced from each other at distances slightly greater than the diameters of the rollers 37. The holes in the lower flanges of the beams 24 are threaded.

In Fig. 2 I show the beam so disposed that its rollers are between the rear and intermediate groups of holes, with bolts 68 engaging the first group of holes with their lower ends screwed into the threaded holes in the lower flanges of the channel beams while the pins 69 are dropped through the intermediate group of holes. Thus the track for the rollers 37 is blocked in either direction. If it be desired to raise the boom into a lower and more retracted position than that shown in Fig. 2 the bolts 68 are shifted to the forward group of holes 67 and when the pins 69 are shifted to the intermediate group of holes, thus anchoring the rollers in another position.

To prevent the boom 35 when retracted accidentally shifting relative to the channel beams 24 I provide a fourth group of holes shown at 70 through which the pins 69 are inserted, which holes and pins are located at the rear of the pin 36 and thus secure the boom against movement rearwardly of the truck body.

It is evident from the foregoing that a motor truck may by the use of my improved boom and winch assembly be fitted as a wrecker truck without impairing its burden-carrying usefulness.

I claim:

1. In a wrecker attachment to be removably mounted on the permanent floor of a truck, the combination of a pair of channels in parallel spaced relation with their webs vertical and their flanges disposed inwardly to form an enclosed track, said channels being arranged to be secured longitudinally of the center of the truck floor, a winch mounted on the forward end portions of the channels, a roller of proper diameter to maintain traveling engagement with the interior of each channel, an axle upon the end portions of which the rollers are mounted, a boom of the proper cross-sectional dimension to be retractable between the channels and to present a top surface level with the top surface of the channels, said boom at its forward end being pivoted on the axle to permit the boom to move with the rollers along the track and to be swung into an elevated position, means to lock the rollers against movement along the track to hold the boom stationary when the latter is retracted or elevated, a sheave mounted on the free end of the boom, a cable running over the sheave and having an end portion wound about the winch, supplemental floor sections positioned on the permanent truck floor between the outer vertical surfaces of the channels and the side walls of the truck body, said floor sections having the same top level as the channels and the retracted boom to complete therewith a load-supporting platform extending the full width of the truck body, the rear ends of the channels and of the floor sections being spaced forward from the rear end of the permanent truck floor to provide a compartment, and a pair of braces having their lower ends pivotally attached to the truck floor adjacent either side thereof and arranged to be swung upwardly and engage the boom when elevated to support and hold the same against side sway and said braces being folded transversely of the floor when the boom is retracted.

2. In a combined general duty and wrecker truck, the combination of a track extending longitudinally of and supported on the permanent floor of the truck but stopping short of the rear end of said floor, roller means arranged to travel on said track, a boom having one end pivotally connected to said roller means, said boom arranged to be movable longitudinally of the track with the roller means and to be elevated into angular relation thereto, a winch, a sheave mounted on the free end of the boom, a cable running over the sheave and having one end portion wound on the winch, supplemental floor sections mounted on the permanent floor of the truck and filling in the spaces between the track and the side walls of the truck body to provide a continuous load-carrying floor, the rear ends of the floor sections and the channels stopping short of the rear end of the permanent floor of the truck, a closure for the rear end of the truck body extending upwardly to the top level of the floor sections thus coacting with the floor and side walls of the truck body and the rear ends of the supplemental floor sections to form a compartment, a pair of braces having their ends pivotally attached in the opposite ends of the compartment and arranged when the boom is retracted to be folded flat into said compartment transversely of the truck body, and when the boom is elevated said braces being swung upwardly to engage the boom and hold the same in position.

3. The structure of claim 2 characterized by the pivotal attachment of the braces being in the form of universal joints.

4. The structure of claim 2 characterized by the pivotal attachment of the braces being in the form of universal joints and at least one of said attachments being movable longitudinally of the truck body to enable the braces to be nested side-by-side when not in use.

5. The structure of claim 2 characterized by a lid arranged to be placed on the compartment when the braces are folded down in the latter, said lid when in place being on the level of the top surfaces of the supplemental floor section to complete a load-carrying surface for the truck.

6. In a wrecker attachment to be removably mounted on the permanent floor of a truck, the combination of a pair of channels in parallel spaced relation with their webs vertical and their flanges disposed inwardly to form an enclosed track, said channels being arranged to be secured longitudinally of the center of the truck floor, a winch mounted on the forward end portions of the channels, a roller of proper diameter to maintain rolling engagement with the interior of each channel, an axle upon the end portions of which said rollers are mounted, a hollow boom of the proper cross-sectional dimension to be retractable between the channels and present a top surface level with the top surface of the channels, said boom at its forward end being pivoted on the axle to permit the boom to move with the rollers along the track and to be swung into an elevated position, means to lock the rollers against movement along the track to hold the boom stationary when the latter is retracted or elevated, a plurality of spaced transversely disposed plates in the interior of the boom adjacent its free end, the plates having aligned holes, a bifurcated bracket having a stem engaging said holes so as to pivot therein, a sheave rotatably mounted between the legs of the bracket, and a cable running over the sheave and having an end portion wound about the winch.

WALTER G. HUTTINGER.

REFERENCES CITED

The following references are of record in the file of this patent:

UNITED STATES PATENTS

| Number | Name | Date |
| --- | --- | --- |
| 1,737,753 | Farnham | Dec. 3, 1929 |
| 2,111,341 | Tetrault | Mar. 15, 1938 |
| 2,145,378 | Trippensee | Jan. 31, 1939 |
| 2,277,529 | Richter | Mar. 24, 1942 |
| 2,283,443 | Klein | May 19, 1942 |
| 2,307,611 | Webster | Jan. 5, 1943 |
| 2,321,549 | Holmes | June 8, 1943 |
| 2,497,379 | Vandergrift, Sr., et al. | Feb. 14, 1950 |